United States Patent
Hoppen et al.

(10) Patent No.: US 7,367,612 B2
(45) Date of Patent: May 6, 2008

(54) LOAD-CARRYING COMPONENT FOR SUPPORTING OF A VEHICLE CROSS-MEMBER

(75) Inventors: Juergen Hoppen, Cologne (DE); Joerg Martini, Köln (DE); Gerald Richter, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/523,179

(22) Filed: Sep. 19, 2006

(65) Prior Publication Data

US 2007/0075567 A1    Apr. 5, 2007

(30) Foreign Application Priority Data

Sep. 19, 2005 (DE) .................. 10 2005 044 747
May 31, 2006 (DE) .................. 10 2006 026 358

(51) Int. Cl.
B62D 25/14 (2006.01)
(52) U.S. Cl. .................... 296/193.02; 296/72
(58) Field of Classification Search ............. 296/192, 296/193.02, 208, 72, 70; 180/90; 62/239, 62/244, 259.1
See application file for complete search history.

(56) References Cited

U.S. PATENT DOCUMENTS

| 4,767,153 | A  | * | 8/1988  | Kawasaki et al. | ..... 296/193.02 |
| 5,673,964 | A  | * | 10/1997 | Roan et al.     | .................. 296/208 |
| 6,234,569 | B1 | * | 5/2001  | Derleth et al.  | ............. 296/208 |
| 6,497,432 | B2 | * | 12/2002 | Scheib et al.   | ............... 280/779 |
| 6,641,195 | B2 | * | 11/2003 | Shikata et al.  | ................ 296/70 |
| 6,648,402 | B2 | * | 11/2003 | Scheib et al.   | .......... 296/203.02 |
| 6,808,218 | B1 | * | 10/2004 | Passebecq et al.| ............ 296/70 |
| 6,851,742 | B1 | * | 2/2005  | Kubiak          | .................. 296/193.02 |
| 6,877,787 | B2 | * | 4/2005  | Ito et al.      | ....................... 296/70 |
| 6,942,910 | B2 | * | 9/2005  | Roberts et al.  | ............ 428/35.8 |
| 7,000,969 | B2 | * | 2/2006  | Baker et al.    | .................. 296/70 |
| 2005/0217295 | A1 | * | 10/2005 | Alberternst et al. | .......... 62/239 |
| 2006/0017309 | A1 | * | 1/2006  | Wolf            | ..................... 296/193.02 |

* cited by examiner

Primary Examiner—Dennis H. Pedder
Assistant Examiner—Mike Hernandez
(74) Attorney, Agent, or Firm—Brinks Hofer Gilson & Lione (57) ABSTRACT

The invention relates to a load-carrying component that makes it possible to support a vehicle cross-member or module carrier on the floor region of the body of a motor vehicle. The load-carrying component serves to attach an air conditioning unit and is connected to as least one casing part of the air conditioning unit such that the load-carrying component and the casing create at least one channel through which conditioned air flows into the passenger compartment of the vehicle.

16 Claims, 6 Drawing Sheets

LOAD-CARRYING COMPONENT FOR SUPPORTING OF A VEHICLE CROSS-MEMBER

BACKGROUND

1. Field of the Invention

The invention relates to a load-carrying component in the interior of a vehicle that makes it possible to support a vehicle cross-member or module carrier on the floor region of the vehicle body. In some cases such load-carrying components themselves, apart from supporting the rails carrying various apparatuses, function to support or mount different accessory parts in vehicles, particularly to mount casings of air conditioning units.

2. Related Technology

The cockpits of modern vehicles are equipped with a plurality of different apparatuses required to enable the vehicle to be operated in a roadworthy condition and according to the approval, as well as to meet the continuously growing demands of comfort and technical development. Requirements of weight and cost reduction and constraints going back to competition of providing higher levels of maintenance and assembly friendliness, accompany the increasing complexity so that all components have to be permanently designed. Permanent perfection of the vehicle body, and accessories connected to it, is extremely important within this development.

Especially different horizontal structural members, which may be equipped with a plurality of prepared possibilities to receive apparatuses or components to be mounted, have become established in vehicle engineering, whereby the structural members are frequently supported on a tunnel arranged along the vehicle longitudinal axis in the floor region of the vehicle body. Not only the assembly possibilities, but also strength and safety aspects, determine the design of those structural members.

Main casings of air conditioning units, together with the components contained in them (such as evaporator, temperature control or door system, heating heat exchanger and, if present, additional heater and air filter) are usually positioned approximately in the vehicle center above the vehicle tunnel and below the instrument panel. As a rule they are mounted to a vehicle cross-member designed as a structural connection of both A-pillars of the vehicle body. In most cases, the vehicle cross-member is supported by tunnel supports in the region of the vehicle center because, with a view to avoiding unnecessary material expenditure, it is dimensioned so that it is unable to bear the loads of those big assembly units without additional support. In the state-of-the-art, for strength and design reasons, the tunnel supports are positioned immediately adjacent to the main casing of the air conditioning unit integrated in the vehicle and, additionally, may be designed to hold the air conditioning unit. In many cases the air conditioning unit is one of the most voluminous assembly units in the front region of the cockpit. In the course of growing demands on the technical performance of air conditioning units in a continually reduced mounting space, the concept of tunnel supports arranged on the sides cannot be kept any longer.

It has been found that the integration of the air conditioning unit between two vertical tunnel supports involves partly considerable disadvantages. The tunnel supports fixed in the vehicle divide the mounting space available in the front region of the cockpit into three zones, whereby this division cannot be later changed. Because the legroom in the front region of the vehicle is desired to be as large as possible, the tunnel supports are mostly arranged such that they are positioned very close to the main casing of the air conditioning unit. In this way, they do not unnecessarily project into the footspace of the driver or passenger excessively limiting their legroom. The configuration close to the main casing, however, involves the disadvantage of restricted freedom for assembly. In addition, the mounting space available to insert the air conditioning unit is unalterably limited on both sides by the tunnel supports. Adaption to subsequent casing shape changes, changed division of the space or later installation of casings with different geometry, is expensive, if possible at all.

In the state-of-the-art, different approaches are known to utilize the strength resources of the installed air conditioning units when configuring the concerned vehicle body portions.

It is known, for example, to functionally integrate the outside of the casing of the air conditioning unit into the load-bearing structures at the front border of the passenger compartment (U.S. Pat. No. 6,231,116 B1). Such a solution, however, requires high adaptation efforts if installation in different body types is planned.

Further, it is known to support the weight of the air conditioning unit at several mounting points in order not to excessively load the vehicle cross-member (U.S. Pat. No. 6,351,962 B1). It may be a problem to adapt this solution to different geometries.

SUMMARY OF THE INVENTION

The present invention aims at providing an improved design solution for the integration of an air conditioning unit into a vehicle that distinguishes itself by good use of the mounting space available, assembly friendliness and easy adaptability to strength requirements, all while involving low material expenditure and offering high flexibility.

The invention transfers the traditional function of tunnel supports to load-carrying components that pass through the casing of an air conditioning unit. Accordingly, in one embodiment the invention is realized by at least one load-carrying component that supports a vehicle cross-member, or module carrier, on the floor region of the vehicle body with the one load-carrying component passing through the casing of the air conditioning unit. With the support shifted into the interior of the air conditioning unit, the support does not limit the outer dimensions of the air conditioning unit.

It is advantageous if the load-carrying component is provided with means to which parts of the casing of the air conditioning unit can be attached. As such the load-carrying component is aligned and dimensioned such that it is predominantly loaded in vertical direction. In this way it can adopt the function of traditional tunnel supports and compensate for other fastening means to receive the air conditioning unit without any limitation of the mounting space available.

Further, the invention considers structural peculiarities of casings of air conditioning units in motor vehicles.

In order to enable different temperature zones for different seats to be generated in air conditioning systems, usually several air channels are established separated from each other, in most cases, by a centrally arranged partition. The partition inserted for separating the air channels is frequently manufactured as a separate component, or purchased from suppliers, respectively.

The present invention is based on the possibility that such a temperature zone partition passes through the main casing, at least through part of it, of an air conditioning unit. Vertically arranged, the partition creates a component that is able to carry loads that up to now have been sustained by tunnel supports according to the state-of-the-art.

According to another embodiment of the invention a load-carrying component is provided that enables a vehicle cross-member or module carrier to be supported on the floor region of a motor vehicle, whereby at the same time the load-carrying component serves to attach an air conditioning unit, whereby it is connected to at least a portion of the casing of the air conditioning unit such that the load-carrying component and the casing of the air conditioning unit form at least one channel through which the conditioned air enters the passenger compartment of the vehicle.

So to speak, functioning of the air conditioning unit is only established by the connection with such a load-carrying component and the involved development of at least one channel which leads the conditioned air into the passenger compartment.

It is advantageous if the load-carrying component is a component that extends generally two-dimensionally ranging from the vehicle cross-member, which extends between the A-pillars of the vehicle body, to a vehicle tunnel in the floor region and which is connected with the vehicle cross-member and the vehicle tunnel. The surface normal to the two-dimensional component is largely in direction of the vehicle cross-member.

A similarly advantageous alternative is produced when the load-carrying component is a component of equal orientation that extends generally two-dimensionally ranging from a module carrier to a vehicle tunnel in the floor region and is connected to the module carrier and the vehicle tunnel.

The design of the load-carrying component as generally two-dimensional component of the orientation described, particularly if the material has sufficient thickness, involves high strength, which is required, on the one hand, to carry the load effectively and, on the other hand, to raise the characteristic frequency of the system formed by the vehicle cross-member, or the module carrier, respectively, and the load-carrying component. Rise of the characteristic frequency effectively eliminates disturbing vibrations in the region of the passenger compartment, especially in the region of the steering system so that also safety-relevant requirements are met. That involves, if the component according to the invention is made of metal, another important advantage over a variety of supporting components made of various traditional plastic materials. For that reason the load-carrying component should preferably be made of metal, but can also be made of alternative materials such as fibre-reinforced plastics, hybrid materials, etc., which meet the strength requirements set on an appropriate load-carrying component. The advantageous properties of metal can be combined with those of different plastic materials, if the load-carrying component is made of metal and then coated with a plastic, which can, for example, be done by spray coating. This, for example, allows to achieve efficient protection from corrosion.

Depending on the priorities in manufacture, detachable or permanent connections between the carrying members, the vehicle tunnel and the load-carrying component may be configured. If the connection is permanent, the load-carrying component virtually becomes a fixed constituent of the vehicle body, which helps to reduce later assembly efforts and hence cost. Detachable connections have the advantage that the design can be changed any time.

The advantages of the invention become fully evident, if the load-carrying component is connected on both sides to at least one part of the casing of the air conditioning unit in such a way that the load-carrying component and the casing of the air conditioning unit define at least one channel on either side of the load-carrying component, through which conditioned air flows into the passenger compartment. In such a construction, the load-carrying component takes the function of the temperature zone partition.

If the load-carrying component is dimensioned such that it is capable to support the vehicle cross-member or the module carrier by itself without any other support sites between the A-pillars of the vehicle, the load-carrying component can compensate for traditional tunnel supports.

Usual seal tightness requirements of the condensate outlet require a drip pan in the bottom region of an air conditioning unit. It is therefore advantageous, if the load-carrying component includes a fixed drip pan. Particularly, the integration of a drip pan into a load-carrying component formed as a temperature zone partition reduces the number of components to be manufactured.

Further, it is advantageous if the load-carrying component is provided with fastening means and/or openings to receive casing parts, heater cores, evaporators, etc., or with seats for appropriate fastening means at the casing parts.

An advantageous embodiment results if the load-carrying component is provided with fastening means to receive casing parts or with seats for appropriate fastening means at the casing parts.

Further, it is advantageous if the load-carrying component is configured in the region of contact to the mounted casing parts such that the casing parts are air- and liquid-tightly connected to the load-carrying component. For that to be obtained, at least one tongue and groove connection or can be provided for sealing. Such a preparation of the load-carrying component makes fast assembly of the complete air conditioning unit easier and makes it possible, on the other hand, to replace defective components without difficulty.

The load-carrying components according to the invention can also advantageously used in multiple arrangements.

These and other aspects and advantages of the present invention will become apparent upon reading the following detailed description of the invention in combination with the accompanying drawings.

DETAILED DESCRIPTION OF THE INVENTION

Figure 1:
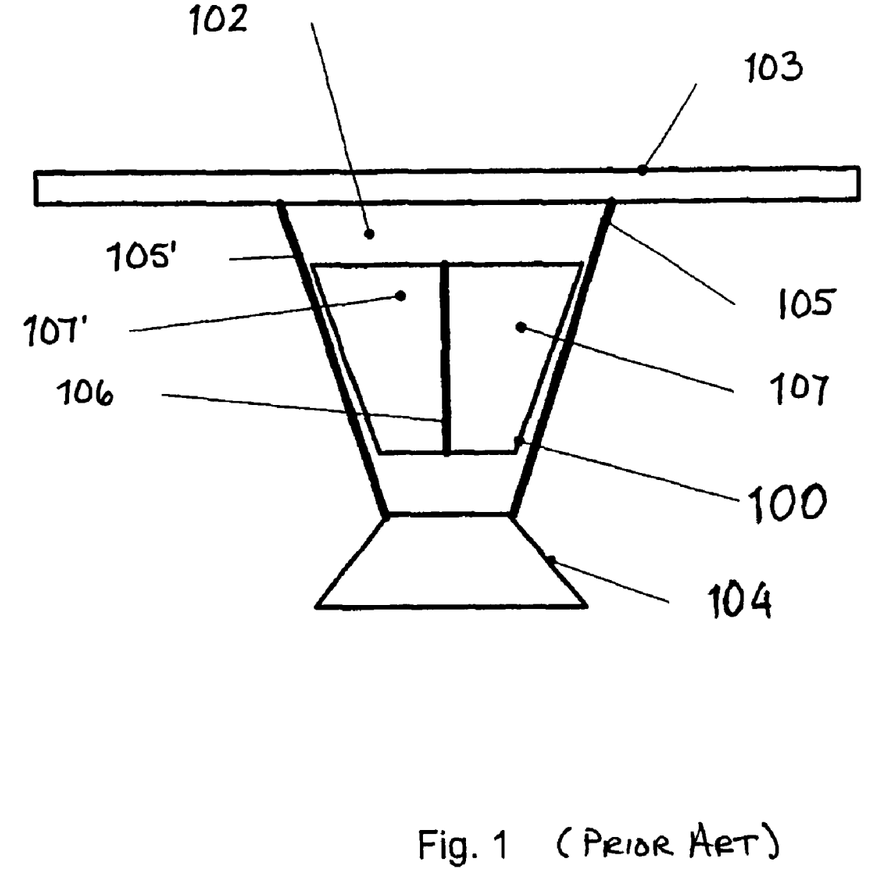
FIG. 1 a schematic representation of a traditional arrangement of an air conditioning unit in a motor vehicle.

Referring now to the drawings, FIG. 1 shows a schematic representation of a traditional arrangement of an air conditioning unit in a motor vehicle. The mounting space 102 available for the installation of the main casing 100 of the air conditioning unit is limited at the top by a vehicle cross-member 103 extending between the A-pillars of the vehicle body (not shown), and is limited at the bottom is limited by a vehicle tunnel 104, which extends in the longitudinal direction of the vehicle, generally the floor region of the vehicle body. The mounting space 102 is limited on the sides by two tunnel supports 105, 105'. The main casing 100 of the air conditioning unit is divided by a vertically arranged temperature zone partition 106 so that two channels 107, 107' are defined through which conditioned air can be conducted into the passenger compartment of the vehicle. The tunnel supports 105, 105', on the one hand, support the vehicle cross-member 103 on the vehicle tunnel 104 and, on the other hand, fix the main casing 100 of the air conditioning unit in a built-in condition. It becomes clear that the temperature zone partition 106 extends through the whole main casing without having any strength function in the vehicle body system. In addition to the main casing 100 the tunnel supports 105, 105' take up mounting space, to the left and right of the main casing 100, that cannot be used for other inserts or that restricts the footspace of the driver and passenger, respectively.

Figure 2:
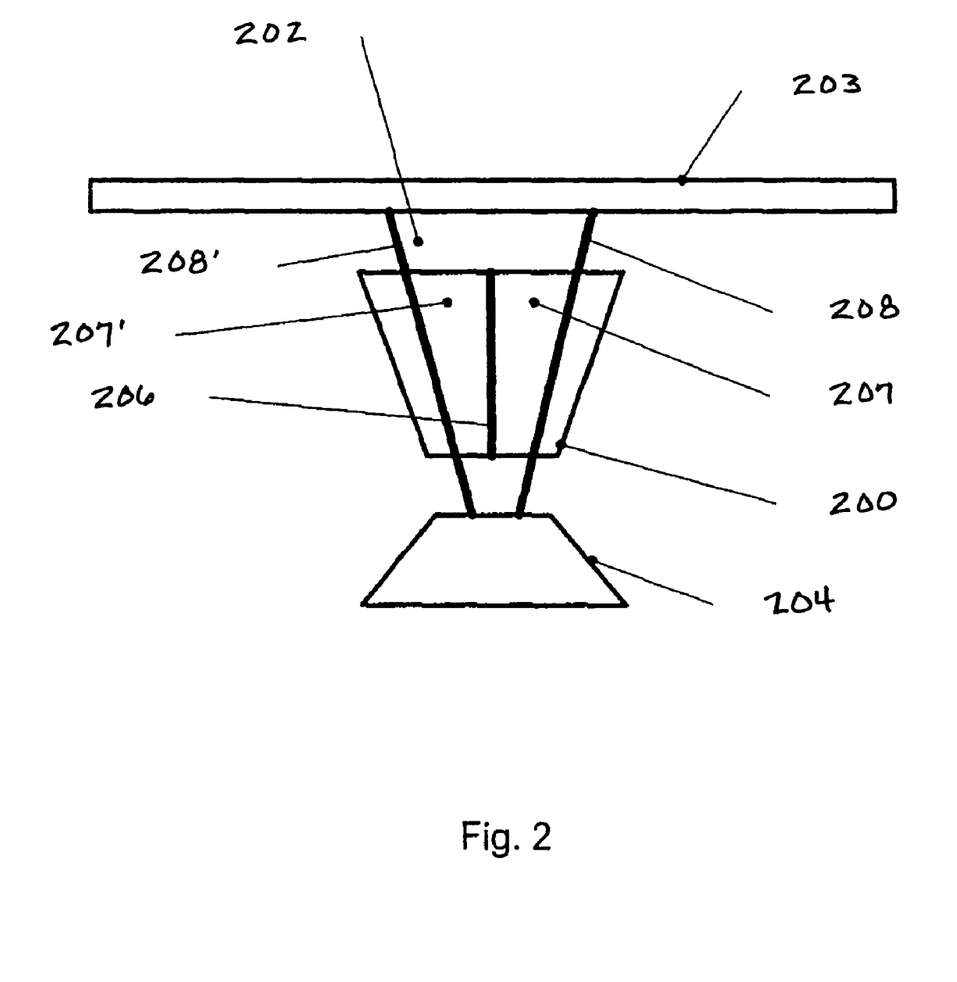
FIG. 2 a schematic representation of an arrangement, embodying the principles of the present invention, of an air conditioning unit in a motor vehicle with vehicle cross-member.

FIG. 2 shows a schematic representation of an arrangement, embodying the principles of the present invention, of an air conditioning unit in a motor vehicle with vehicle cross-member. As with the prior art, a mounting space 202 has available for the installation of the main casing 200 of the air conditioning unit is limited at the top by a vehicle cross-member 203 extending between the A-pillars of the vehicle body (not shown), and is limited at the bottom by a vehicle tunnel 204, which extends in vehicle longitudinal direction (which is into the page in the figure) in the floor region of the vehicle body. Unlike the prior art, there are no tunnel supports arranged on the sides of the casing 100. Instead, such supports are replaced with a pair of load-carrying components 208, 208', which pass through the casing 200 of the air conditioning unit. As a result, the mounting space 202 is no longer limited on its sides by tunnel supports. The main casing 100 of the air conditioning unit is divided by a vertically arranged temperature zone partition 206 so that two channels 207, 207' are defined through which the conditioned air can be conducted into the passenger compartment. As seen in the figure, the load-carrying components 208, 208' are arranged so as to extend through the interior of these channels 207, 207'.

The load-carrying components 8, 8' are provided with various well known structures (mounting brackets, flanges, etc.) to which corresponding parts of the casing 200 of the air conditioning unit can be mounted, whereby the load-carrying components 8, 8' are aligned and dimensioned such that they are predominantly loaded in a vertical direction. In this way the load-carrying components 208, 208' largely take the functions of traditional tunnel supports and can compensate for them while avoiding the associated limitations on the mounting space.

Figure 3:
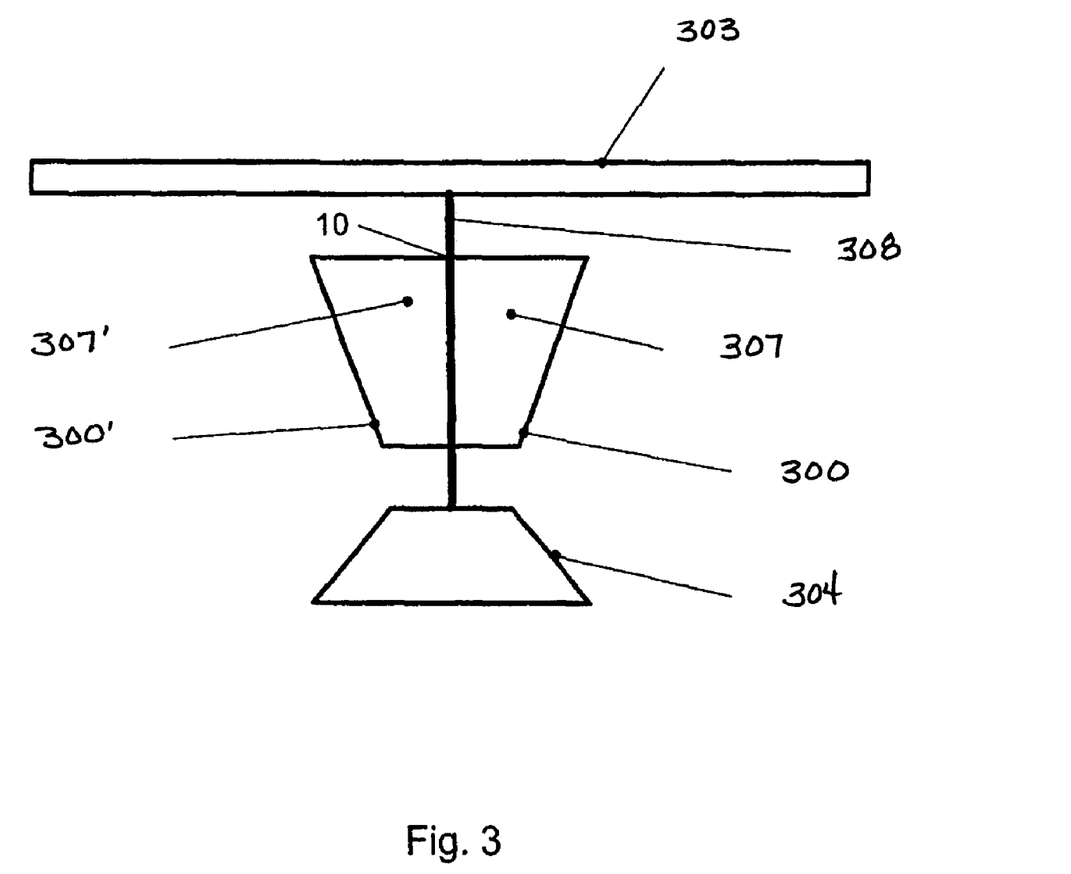
FIG. 3 a schematic representation of an alternative arrangement according to the present invention of an air conditioning unit in a motor vehicle with a vehicle cross-member.

FIG. 3 shows a schematic representation of an alternative arrangement according to the present invention, of an air conditioning unit in a motor vehicle with a vehicle cross-member. The vehicle cross-member 303 supports itself on a load-carrying component 308, which extends in vertical direction from the vehicle cross-member 303 to the vehicle tunnel 304, and is attached so as to permanently connected to both of them together. The load-carrying component 308 is sized and dimensioned such that it is capable to support the vehicle cross-member 303 between the A-pillars of the vehicle by itself without any other supports. Therefore, the load-carrying component 308 compensates for traditional tunnel supports. The mounting space 302 available for the installation of the main casing 300 of the air conditioning unit is only limited at the top by the vehicle cross-member 303 and at the bottom by the vehicle tunnel 304, which extends in vehicle longitudinal direction in the floor region of the vehicle body. The load-carrying component 308 is connected on both sides or halves to a part of the casing 300, 300', in each case, of the air conditioning unit such that the load-carrying component 308 and the casing 300, 300' of the air conditioning unit on either side of the load-carrying component 308 create one channel 307, 307', respectively, through which conditioned air flows into the passenger compartment of the vehicle. In this arrangement, the load-carrying component 308 also functions as a temperature zone partition for the air conditioning unit.

Figure 4:
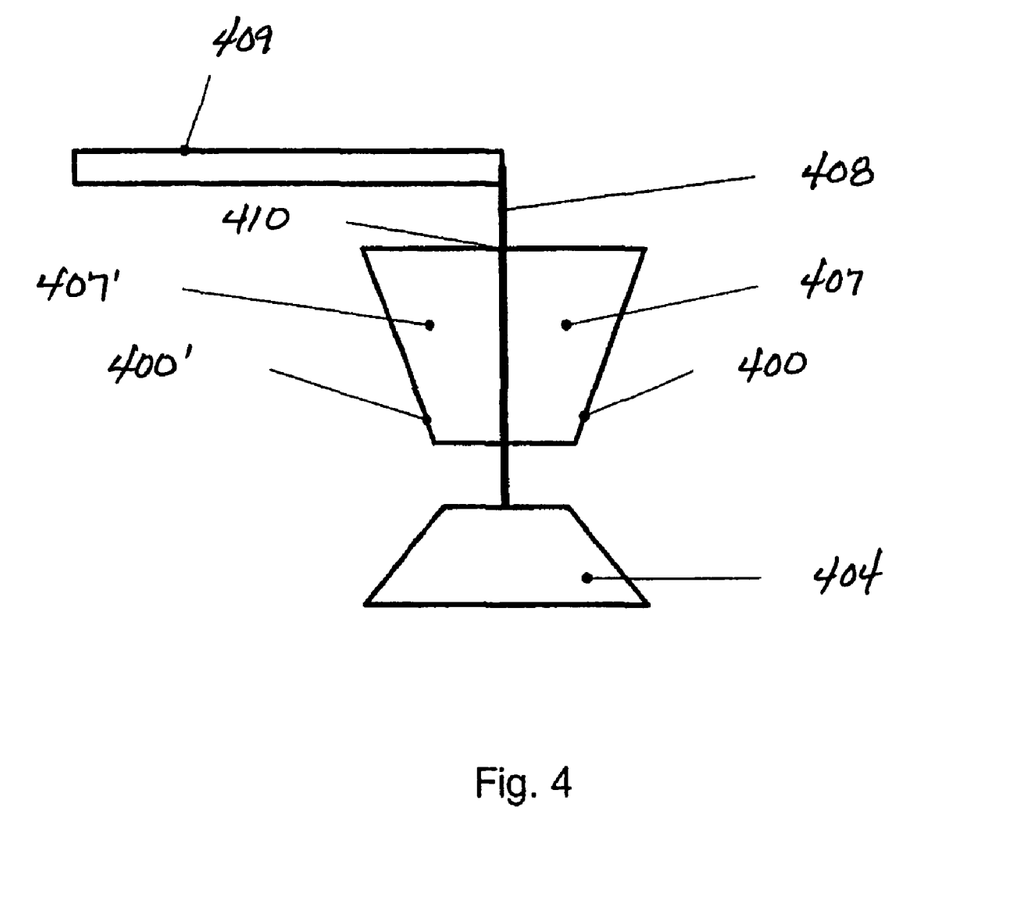
FIG. 4 a schematic representation of an arrangement according to the invention of an air conditioning unit in a motor vehicle with a module carrier.

FIG. 4 shows a schematic representation of a further arrangement, according to the present invention, of an air conditioning unit in a motor vehicle with module carrier. In contrast to the embodiment shown in FIG. 3, the module carrier 409 does not extend over the whole distance between the A-pillars, but ranges only from the A-pillar on the driver's side (not shown) of the vehicle up to the load-carrying component 408 of this embodiment. In this arrangement, the load-carrying component 408 not only prevents the module carrier 409 from being bent down too much, but also functions to completely support the module carrier 409 in the region above the vehicle tunnel 404. Otherwise the embodiments in the FIGS. 3 and 4 are similar. In each case, the load-carrying component 308, 408 is a generally two-dimensional component configured so as to be sufficiently strong to support the air conditioning unit and whose extent is sufficient to completely separate both halves of the main casing 400, 400' from each other defining separate channels 307, 307' and 407, 407' for providing air to the driver and passenger sides of the vehicle passenger compartment. The load carrying components 308, 408 are also sized and configured to connect the cross member 303 and module carrier 409 to the vehicle tunnel 404. Preferably, in a contact region 410 with the mounted parts of the casing 400, 400' the load-carrying component 308, 408 is configured such that the parts of the casing 400, 400' are air- and liquid-tightly connected to the load-carrying component 408. This may be achieved via a tongue and groove connection between halves of the casing 400, 400' and the load-carrying component 408, with forming the tongue and extending into a groove formed with the load-carrying component 408.

Figure 5:
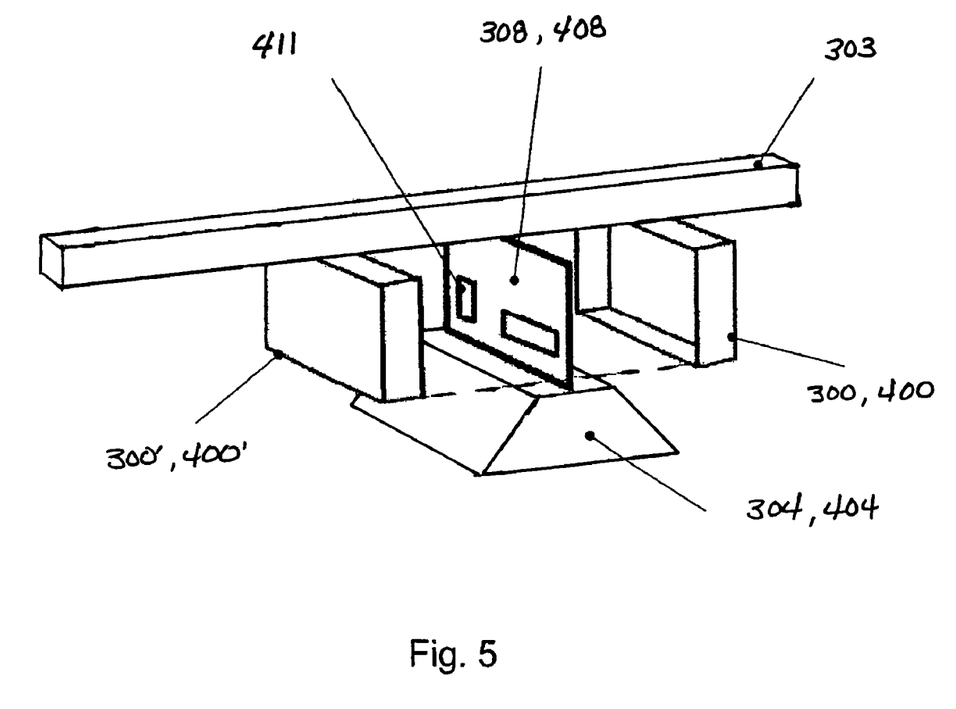
FIG. 5 an embodiment of a load-carrying component according to the principles of the present invention as a temperature zone partition.

FIG. 5 shows a perspective view of one embodiment of a load-carrying component 308, 408 seen in FIGS. 3 and 4 forming a temperature zone partition with a vehicle cross-member 303. The previously two-dimensional configuration of the load-carrying component 308, 408 is seen, as are the openings 411 for components of an air conditioning unit, especially for heat exchangers, and for the reception of appropriate fastening means at the parts of the casing 300, 300', 400, 400' enabling fast assembly.

Figure 6:
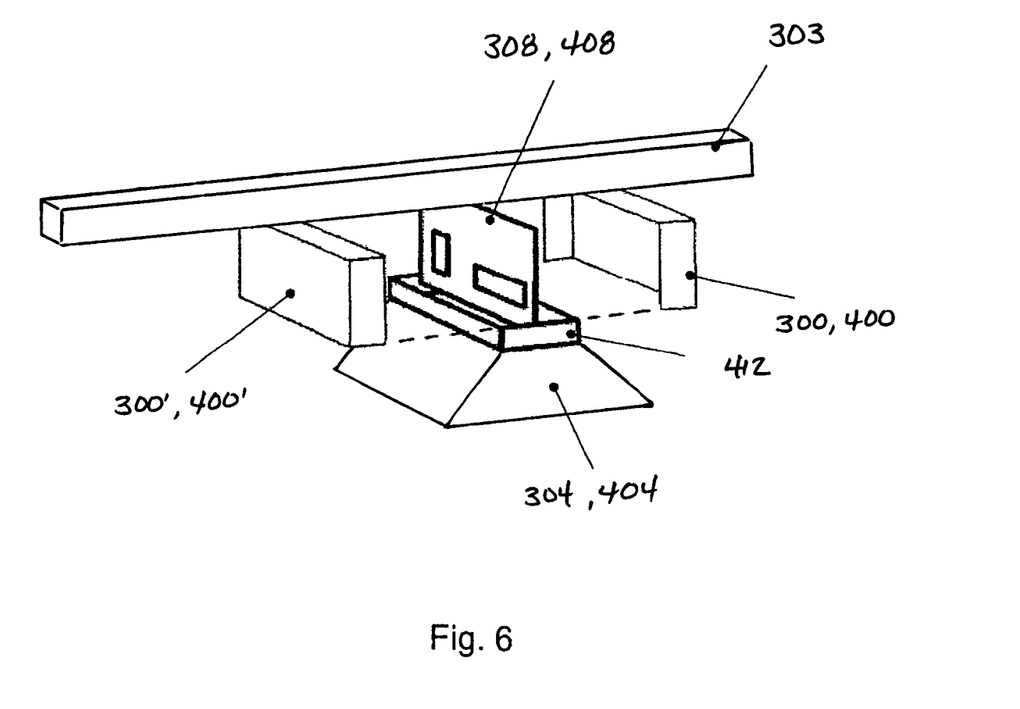
FIG. 6 an embodiment of a load-carrying component according to the invention as a temperature zone partition with an integrated drip pan.

FIG. 6 shows a perspective view of a further embodiment of a load-carrying component 308, 408, more particularly as a temperature zone partition with an integrated drip pan 412 so that the assembly effort required to install a drip pan as a separate component is eliminated. This construction additionally reduces and/or eliminates seal surfaces and ensures air- and liquid-tight assembly.

It is therefore intended that the foregoing detailed description be regarded as illustrative rather than limiting, and that it be understood that it is the following claims, including all equivalents, that are intended to define the spirit and scope of this invention.

What is claimed is:

1. A load-carrying assembly for supporting a cross vehicle support of a motor vehicle, the assembly comprising:
   a load-carrying component supporting the cross vehicle support, the load-carrying component extending between the cross vehicle support and the floor region of the body; and
   an air conditioning unit mounted to the load-carrying component, the load-carrying component passing through a casing of the air conditioning unit.

2. The load-carrying assembly of claim 1 wherein the load-carrying component is provided with mounting portions to which the casing of the air conditioning unit is attached, the load-carrying component being aligned and dimensioned such that it is loaded predominantly in vertical direction relative to the motor vehicle.

3. A load-carrying assembly for supporting a cross vehicle support of a motor vehicle, the assembly comprising:
   a load-carrying component supporting the cross vehicle support, the load-carrying component extending between the cross vehicle support and the floor region of the body; and
   an air conditioning unit mounted to the load-carrying component, the load-carrying component passing through a casing of the air conditioning unit;
   wherein the load-carrying component is connected to at least one casing part of the air conditioning unit such that the load-carrying component and the casing define at least one channel through which conditioned air flows into the passenger compartment of the motor vehicle.

4. The load-carrying assembly of claim 1 wherein the load-carrying component extends generally two-dimensionally from the cross vehicle support to a vehicle tunnel in the floor region of the vehicle body and is mounted to the vehicle tunnel.

5. The load-carrying assembly of claim 3 wherein the load-carrying component includes opposing sides and is connected on each opposing side to a casing part of the air conditioning unit such that the load-carrying component and the casing parts of the air conditioning unit create at least one channel on both of the opposing sides of the load-carrying component through which conditioned air flows into the passenger compartment.

6. The load-carrying assembly of claim 1 wherein the load-carrying component supports the cross vehicle support between A-pillars of the motor vehicle without aid from other support structures.

7. A load-carrying assembly for supporting a cross vehicle support of a motor vehicle, the assembly comprising:
   a load-carrying component supporting the cross vehicle support, the load-carrying component extending between the cross vehicle support and the floor region of the body; and
   an air conditioning unit mounted to the load-carrying component, the load-carrying component passing through a casing of the air conditioning unit;
   wherein the load-carrying component includes a permanently connected drip pan.

8. The load-carrying assembly of claim 1 wherein the load-carrying component provided with at least one groove that defines a seat, the casing part defining a tongue located within the groove and forming a seal therewith.

9. The load-carrying assembly of claim 1 wherein the load-carrying component is attached to at least one casing part of the air conditioning unit forming an air and liquid-tight connected therebetween.

10. The load-carrying assembly of claim 1 wherein the load-carrying component is permanently connected to the vehicle cross-member or the module carrier and to a vehicle tunnel in the floor region of the vehicle body.

11. The load-carrying assembly of claim 1 wherein the load-carrying component is detachably connected to the vehicle cross-member or the module carrier and to a vehicle tunnel in the floor region of the vehicle body.

12. A load-carrying assembly for supporting a cross vehicle support of a motor vehicle, the assembly comprising:
   a load-carrying component supporting the cross vehicle support, the load-carrying component extending between the cross vehicle support and the floor region of the body; and
   an air conditioning unit mounted to the load-carrying component, the load-carrying component passing through a casing of the air conditioning unit;
   wherein the load-carrying component is provided with at least one opening extending therethrough, at least one heat exchanger being located within the at least one opening and extending through the load-carrying component.

13. The load-carrying assembly of claim 1 wherein the load-carrying component is made of metal.

14. The load-carrying assembly of claim 1 wherein the load-carrying component is made of metal and coated with a plastic.

15. The load-carrying assembly of claim 1 wherein the load-carrying component is made of a hybrid material.

16. The load-carrying assembly of claim 1 having a second load-carrying component extending between the cross vehicle support and the floor region of the body.

* * * * *

UNITED STATES PATENT AND TRADEMARK OFFICE
CERTIFICATE OF CORRECTION

| | | |
|---|---|---|
| PATENT NO. | : 7,367,612 B2 | Page 1 of 1 |
| APPLICATION NO. | : 11/523179 | |
| DATED | : May 6, 2008 | |
| INVENTOR(S) | : Juergen Hoppen et al. | |

It is certified that error appears in the above-identified patent and that said Letters Patent is hereby corrected as shown below:

On the Title Page

Item 56, under "U.S. PATENT DOCUMENTS", insert the following:

--6,231,116    5/2001   Naert et al.
  6,351,962    3/2002   Mizutani et al.--.

Signed and Sealed this

Seventh Day of October, 2008

JON W. DUDAS
*Director of the United States Patent and Trademark Office*